(12) United States Patent
Bridges

(10) Patent No.: US 7,987,819 B1
(45) Date of Patent: Aug. 2, 2011

(54) ANIMAL WASHING SYSTEM

(76) Inventor: Jeffrey A. Bridges, Allen, TX (US)

(*) Notice: Subject to any disclaimer, the term of this patent is extended or adjusted under 35 U.S.C. 154(b) by 562 days.

(21) Appl. No.: 12/104,412

(22) Filed: Apr. 16, 2008

Related U.S. Application Data

(60) Provisional application No. 60/923,562, filed on Apr. 16, 2007.

(51) Int. Cl.
*A01K 13/00* (2006.01)

(52) U.S. Cl. ............................ 119/604; 15/416

(58) Field of Classification Search .................. 119/604, 119/602, 603, 665, 668; 15/322, 415.1, 416, 15/421

See application file for complete search history.

(56) References Cited

U.S. PATENT DOCUMENTS

| | | | |
|---|---|---|---|
| 5,157,805 A * | 10/1992 | Pinter | 15/322 |
| 5,484,427 A * | 1/1996 | Gibbons | 604/313 |
| 5,503,594 A * | 4/1996 | Karubian et al. | 452/173 |
| 5,768,748 A * | 6/1998 | Silvera et al. | 15/402 |
| 5,891,198 A * | 4/1999 | Pearlstein | 8/158 |
| 6,055,938 A * | 5/2000 | Klein | 119/627 |
| 6,345,592 B1 * | 2/2002 | Hollis | 119/604 |
| 6,446,578 B1 * | 9/2002 | Irwin | 119/604 |
| 6,453,848 B1 * | 9/2002 | Hachey | 119/602 |
| 7,234,419 B2 * | 6/2007 | Hutchinson et al. | 119/603 |
| 7,389,747 B2 * | 6/2008 | Inahara et al. | 119/677 |
| 7,647,892 B2 * | 1/2010 | Inahara et al. | 119/668 |
| 7,761,955 B1 * | 7/2010 | Hiltz | 15/322 |
| 7,770,254 B2 * | 8/2010 | Alexander | 15/321 |
| 2007/0028412 A1 * | 2/2007 | Carter et al. | 15/321 |

* cited by examiner

*Primary Examiner* — Yvonne R. Abbott
(74) *Attorney, Agent, or Firm* — Law Office of JD Pemberton; John Pemberton

(57) ABSTRACT

A portable animal washing system having a means of dispensing a pressurized liquid cleaning agent, a means of dispensing a pressurized liquid rinsing agent, a means of extracting said liquid cleaning and rinsing agents as well as any dislodged dirt, debris, parasites, or foreign matter from the animal's coat, and a means of drying the animal's coat. The device is designed in such a way that both the cleaning and the rinsing agents may be directed into and under the animal's coat and then be immediately extracted along with any dislodged dirt, debris, parasites or other foreign material. The device is also design in such a way as to direct a stream of heated forced air into and under the coat of the animal so as to dry the animal.

20 Claims, 4 Drawing Sheets

ANIMAL WASHING SYSTEM

CLAIM OF PRIORITY

This application claims the benefit of U.S. Provisional Application No. 60/923,562 filed Apr. 16, 2007 which is incorporated herein by reference.

BACKGROUND OF THE INVENTION

1. Technical Field

This invention relates to animal grooming devices, and more particularly, to an animal washing system.

2. Description of Related Art

Essential to the washing and drying of domesticated animals are five basic steps: 1) wetting the coat, 2) applying a cleaning agent such as a soap, shampoo, or detergent, 3) rinsing the cleaning agent, dirt, debris, parasites, and other foreign matter from the animal's coat, 4) extracting any residual agents, dirt, debris, parasites, or foreign matter from the animal's coat, and 5) drying the animal's coat. Traditional methods require considerable effort before, during and after the process. For example, before the washing and drying can begin, various items such as soap, brushes, hoses, buckets, towels, and the like are needed and must be gathered together. Once all the necessary items are assembled, the process tends to be very messy due to the splashing of water from scrubbing the animal and/or the spray of water due to the animal shaking. Then there is the cleanup after the process and some individuals consider that the worst part of the whole ordeal.

Also, the traditional methods of washing animals normally consumes large amounts of water that is not only relatively expensive but is also wasteful. Another issue with traditional animal washing methods is the effort that is required to apply a cleaning agent to the animal because considerable effort must be used with the hands to message the cleaning agent into the animal's coat. Not only can this be very time consuming it is often exhausting work. After the cleaning agent has been applied to the animal, particular attention must be paid to rinsing the animal because some animals are very sensitive to some cleaning agents and it is extremely important that the animal be thoroughly rinsed to ensure that there is no residual cleaning agent left that could cause irritation. Another aspect of the washing process that is very important to the well being of some animals is the drying process because if some animals are left wet, they can easily become sick. What is needed is a device and method that can help alleviate or reduce the above mentioned problems. It would be especially beneficial if the device and method could improve the rinsing and drying of the animal.

SUMMARY OF INVENTION

The present invention solves the above-described problem by providing a device and method that includes a source of pressurized fluid and at least one nozzle to direct the pressurized fluid at least partially into and under an animal's coat and in one embodiment onto it's skin. In one embodiment, there are two sets of nozzles and the first set of nozzles is connected to a pressurized fluid source that contains a cleaning agent. The first set of nozzles is used to wet the animal's coat and skin and apply a cleaning agent. By way of example and not of limitation, the cleaning agent may be a mixture of water and soap, shampoo, detergent or some other cleaning agent used to clean an animal. In one embodiment, the cleaning agent is medicine, a therapeutic agent, or perfume or other aromatic agent. The second set of nozzles is connected to a pressurized fluid source that contains a rinsing agent such as water. The rinsing agent is used to rinse at least a portion of the cleaning agent, hair, dirt, debris, parasites, and other foreign matter from the animal's coat and skin.

The invention also utilizes a means of suction to immediately extract at least a portion of the cleaning or rinsing agents, dirt, debris, parasites, or other foreign matter from the animal's coat and skin. In one embodiment, to assist in drying the animal, the system contains a means of delivering heated forced air to dry the animal's coat and skin.

The first and second set of nozzles, suction means, and drying means are all contained in one cleaning head. In use, the cleaning head is moved along the animal's body in a solitary progressive motion such that the above described device and method accomplishes all five steps of the animal washing and drying process in one progressive motion while allowing the user to only use one hand to wash and dry an animal. The pressurized fluid supply, vacuum assembly, and forced air dryer functions can be operated together and swept over the animal such that the animal is washed, rinsed, and dried in one progressive motion. Alternatively, the pressurized fluid supply, vacuum assembly, and forced air dryer functions can be operated independently or in any combination depending on the circumstances. In addition, the system can use either hot, cold, or warm fluids depending on the need and availability of such fluids.

It has been found that the present invention allows the cleaning of animals much more efficiently than by traditional methods by reducing the amount of water and additives used. In addition, the present invention saves the user money on both the amount of water and the amount of energy it takes to heat up the water used. Also, the present invention is far more environmentally friendly than are traditional methods in that it requires less heating energy, less water purification, and creates fewer burdens on water supplies and water treatment facilities than the traditional method.

DETAILED DESCRIPTION OF THE INVENTION

Figure 1:
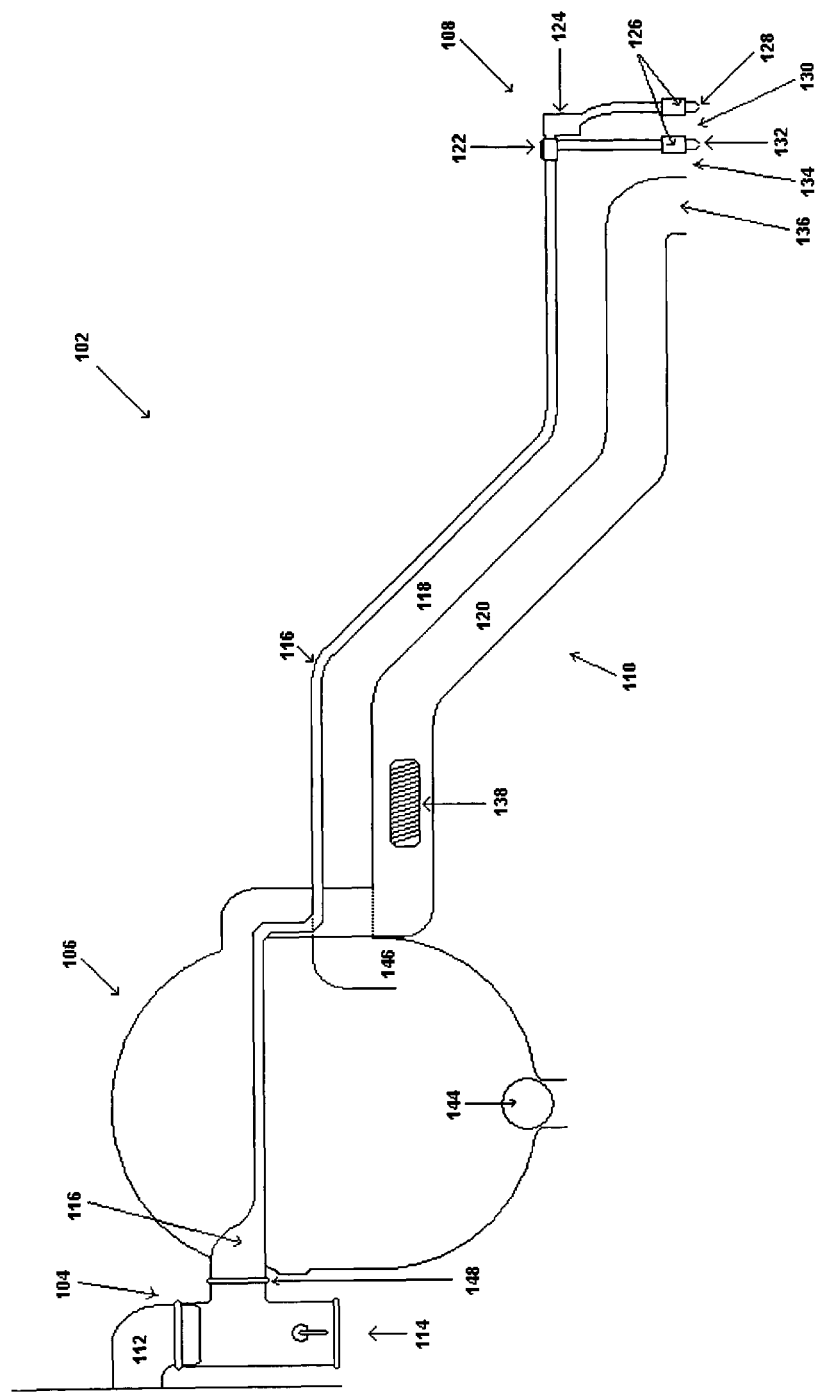
FIG. 1 is an elevation view of an animal washing device in accordance with an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Figure 3:
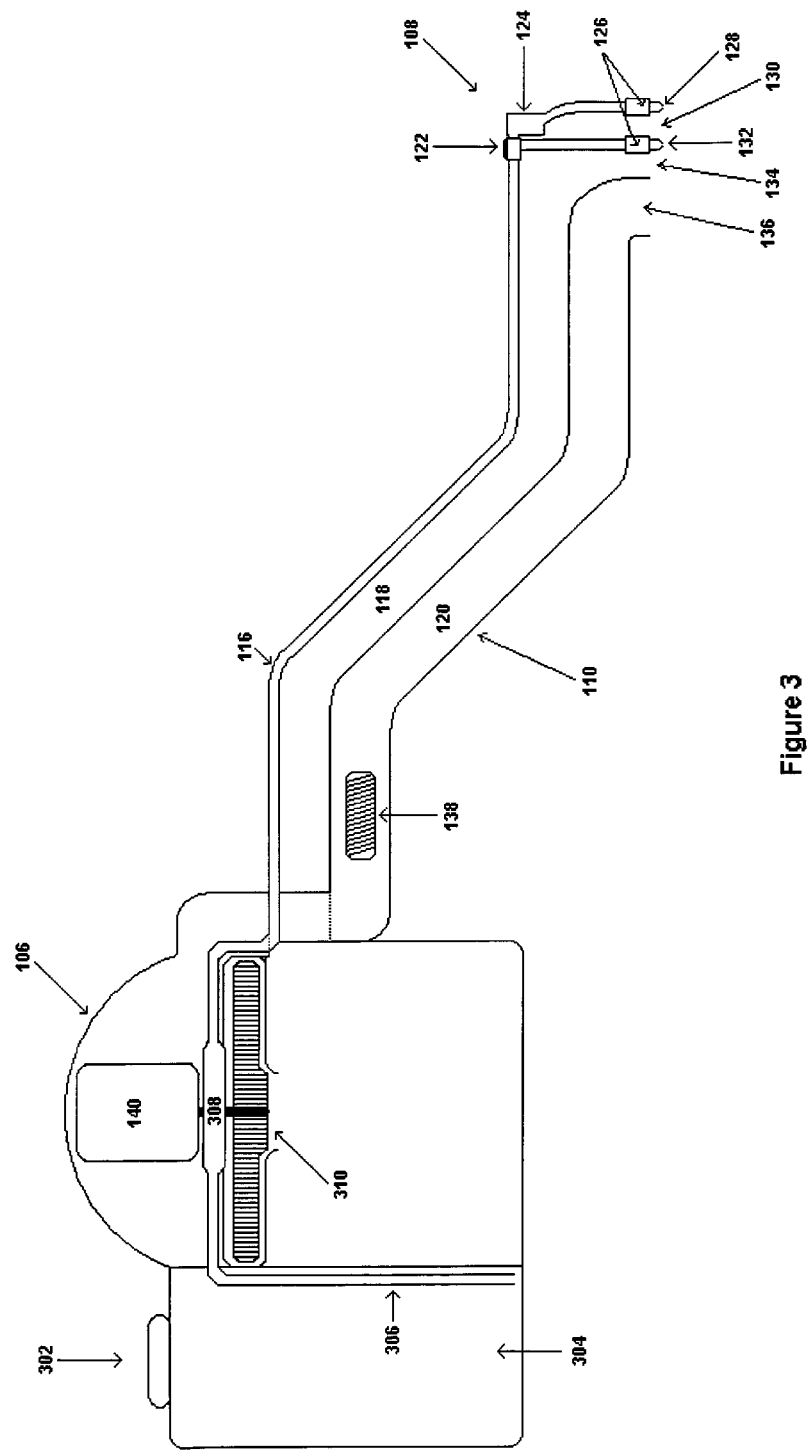
FIG. 3 is an elevation view of a portable animal washing device in accordance with an embodiment of the present invention.

FIG. 1 shows animal cleaner 102. Animal cleaner 102 contains pressurized fluid connection assembly 104, vacuum 106, cleaning head 108, and cleaning conduit 110. Pressurized fluid connection assembly 104 is comprised of pressurized fluid source 112 and bypass valve 114. Bypass valve 114 allows the pressurized fluid to be tested for the correct temperature and pressure and can be used as a bypass and keep the pressurized fluid from entering pressurized fluid supply conduit 116. Pressurized fluid source 112 is any source able to supply a sufficient amount of pressure and fluid to enable animal cleaner 102 to function. By way of example and not of limitation, pressurized fluid source 112 may be a faucet, hydrant, or some other means of generating a pressurized fluid. In addition, pressurized fluid source 112 may be a portable source of pressurized fluid similar to the one shown in FIG. 3. FIG. 3 shows animal cleaner 102 containing portable pressurized fluid source 302.

Figure 2:
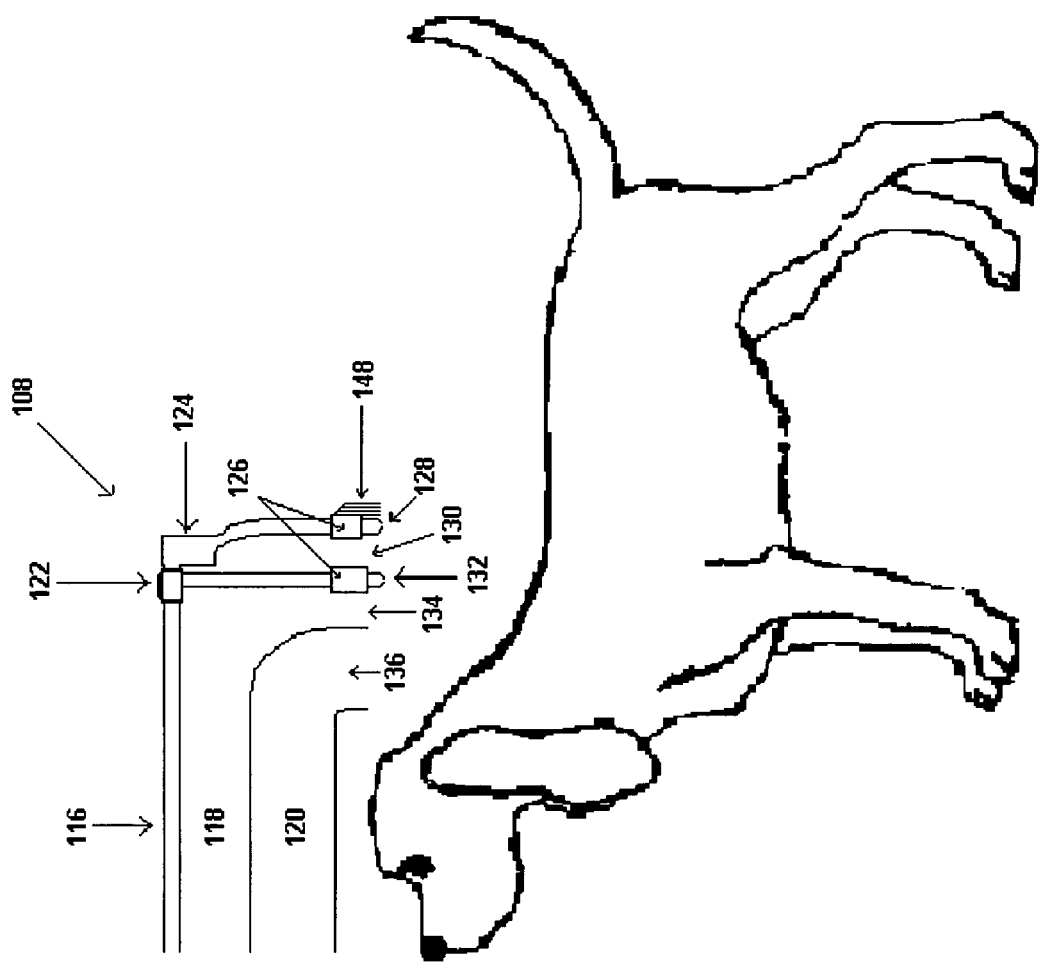
FIG. 2 is an elevation view of the cleaning head assembly of the invention in accordance with an embodiment of the present invention.

Portable pressurized fluid source 302 is able to create and maintain pressure on a fluid such that at least the minimum amount of pressurized fluid necessary for operation of the system can be delivered to animal cleaner 102. In one embodiment, portable pressurized fluid source 302 contains fluid reservoir 304 and fluid pickup tube 306. Fluid reservoir 304 contains the fluid used by animal cleaner 102. Fluid pickup tube 306 transports the fluid to pump 308 where the fluid is pressurized and the pressurized fluid is delivered to pressurized fluid supply conduit 116. In one embodiment, animal cleaner 102 contains universal valve 148 (FIG. 1) that allows pressurized fluid supply conduit 116 to be attached to either pressurized fluid source 112 or portable pressurized fluid source 302 (FIG. 2) relatively easily. Pump 308 may be located in portable pressurized fluid source 302 or may be in vacuum 106 and powered by motor 140. In one embodiment, if vacuum 106 contains fan 310, the back pressure of fan 310 may be used to cause fluid to be drawn into pickup tube 306 and delivered to pressurized fluid supply conduit 116. Herein and throughout, unless stated otherwise, pressurized fluid source 112 and portable pressurized fluid source 302 can be used interchangeably as both function to deliver a pressurized fluid to pressurized fluid supply conduit 116.

Pressurized fluid source 112 (FIG. 1) delivers pressurized fluid to pressurized fluid supply conduit 116 and pressurized fluid supply conduit 116 allows the pressurized fluid from pressurized fluid source 112 to flow to cleaning head 108. Cleaning conduit 110 contains pressurized fluid supply conduit 116 and vacuum conduit 118 and connects pressurized fluid supply conduit 116 and vacuum conduit 118 to cleaning head 108. In one embodiment, cleaning conduit 110 is flexible such that cleaning conduit 110 and cleaning head 108 can be relatively easily moved around an animal as the animal is being washed. Cleaning head 108 is shown in to detail in FIG. 2.

Cleaning head 108 is comprised of pressurized fluid supply control valve 122, cleaning agent receptacle 124, at least one cleaning agent spray nozzle 128, cleaning agent/contaminated fluid extraction nozzle 130, at least one rinsing agent spray nozzle 132, and rinsing agent/contaminated fluid extraction nozzle 134. In one embodiment, cleaning head 108 contains contact sensor 126. Contact sensor 126 is able to detect when cleaning head 108 is proximate to the animal's coat and activates cleaning agent spray nozzle 128, rinsing agent spray nozzle 132, cleaning agent/contaminated fluid extraction nozzle 130 and rinsing agent/contaminated fluid extraction nozzle 134 either separately or in combination.

In one embodiment, pressurized fluid supply control valve 122 splits the pressurized fluid from pressurized fluid supply conduit 116 into two streams. One stream is delivered to at least one cleaning agent spray nozzle 128 and the second stream is delivered to at least one rinsing agent spray nozzle 132. Pressurized fluid supply control valve 122 controls the discharge of pressurized fluid from at least one cleaning agent spray nozzle 128 and at least one rinsing agent spray nozzle 132.

In another embodiment, pressurized fluid supply control valve 122 controls whether the fluid from pressurized fluid supply conduit 116 is sent only to at least one cleaning agent spray nozzle 128, only to at least one rinsing agent spray nozzle 132 or to both. In this manner, pressurized fluid supply control valve 122 can control whether pressurized fluid is only discharged from at least one cleaning agent spray nozzle 128, only discharged from at least one rinsing agent spray nozzle 132, or is discharged from both. In another embodiment, pressurized fluid supply control valve 122 controls the pressure of the pressurized fluid. In another embodiment, fluid supply control valve 122 controls the amount of fluid discharged and whether or not the fluid contains a cleaning agent from cleaning agent receptacle 124. In another embodiment, there are multiple fluid supply control valves 122 and each fluid supply control valve 122 controls a nozzle and the pressure and/or fluid discharged from each fluid supply control valve 122. In one embodiment contact sensor 126 is attached to fluid supply control valve 122 such that contact sensor 126 is a secondary valve wherein fluid pressurized fluid supply control valve 122 is activated upon activation of contact sensor 126.

Before pressurized fluid is discharged from at least one cleaning agent spray nozzle 128, it enters cleaning agent receptacle 124. Cleaning agent receptacle 124 contains the cleaning agent that is used to clean the animal. By way of example and not of limitation, the cleaning agent may be a mixture of water and soap, shampoo, detergent or some other cleaning agent used to clean an animal. In one embodiment, cleaning agent receptacle 124 contains medicine, a therapeutic agent, or perfume or other aromatic agent. If cleaning agent receptacle 124 does contain medicine, a therapeutic agent, or perfume or other aromatic agent, then rinsing agent spray nozzle 132 and vacuum 106 would not be activated or vacuum 106 would only create a relatively low suction such that the desired amount of medicine, a therapeutic agent, or perfume or other aromatic agent would be applied to the animal and not removed by cleaning agent/contaminated fluid extraction nozzle 130 and rinsing agent/contaminated fluid extraction nozzle 134. Once the pressurized fluid enters cleaning agent receptacle 124, the cleaning agent contained in cleaning agent receptacle 124 becomes mixed with the pressurized fluid and the mixture is sent to at least one cleaning agent spray nozzle 128 where it is discharged onto the coat of the animal.

At least one rinsing agent spray nozzle 132 discharges relatively clean pressurized fluid onto the animal such that the cleaning agent on the animal can be extracted. In one embodiment, at least one cleaning agent spray nozzle 128 and/or at least one rinsing agent spray nozzle 132 contain comb 148. Comb 148 is used to assist in allowing at least a portion of the discharge from cleaning agent spray nozzle 128 and rinsing agent spray nozzle 132 into and under the animal's coat. In one embodiment, at least one comb 148 is located on cleaning head 108 proximate to at least one cleaning agent spray nozzle 128 and/or at least one rinsing agent spray nozzle 132.

Cleaning agent/contaminated fluid extraction nozzle 130 and rinsing agent/contaminated fluid extraction nozzle 134 are attached to vacuum 106 and are located on cleaning head 108 such that at least a portion of the discharge from at least one cleaning agent spray nozzle 128 is collected by cleaning agent/contaminated fluid extraction nozzle 130 and at least a portion of the discharge from at least one rinsing agent spray nozzle 132 is collected by rinsing agent/contaminated fluid extraction nozzle 134.

The discharged from at least one cleaning agent spray nozzle 128 is directed into and potentially under the animal's coat to rinse the cleaning agent, hair, dirt, debris, parasites, and/or other foreign matter from the animal's coat and skin. Then, immediately after the cleaning agent has been forced into and under the animal's coat it is extracted along with some cleaning agent, loose hair, dislodged dirt, debris, parasites, and/or other foreign matter from the animal's coat and skin via cleaning agent/contaminated fluid extraction nozzle 130.

Also, the discharge from at least one rinsing agent spray nozzle 132 is directed into and potentially under the animal's coat to rinse the cleaning agent, hair, dirt, debris, parasites, and/or other foreign matter from the animal's coat and skin. Then, immediately after the rinsing agent has been forced into and under the animal's coat at least a portion is extracted along with some cleaning agent, loose hair, dislodged dirt, debris, parasites, and/or other foreign matter from the animal's coat via rinsing agent/contaminated fluid extraction nozzle 134.

The vacuum action in cleaning agent/contaminated fluid extraction nozzle 130 and rinsing agent/contaminated fluid extraction nozzle 134 is created by vacuum 106 (FIG. 1). Vacuum 106 is any device able to create a strong enough vacuum to collect at least a portion of the discharge from at least one cleaning agent spray nozzle 128 and at least a portion of the discharge from at least one rinsing agent spray nozzle 132. In one embodiment vacuum 106 is able to create a relatively large vacuum action such that a relatively large amount of cleaning agent, loose hair, dislodged dirt, debris, parasites, and/or other foreign matter is extracted from the animal's coat and skin. In another embodiment, the vacuum in cleaning agent/contaminated fluid extraction nozzle 130 is different from the vacuum in rinsing agent/contaminated fluid extraction nozzle 134. In another embodiment, vacuum 106 is sonically insulated or muffled by mean of isolation, insulation, or sound wave interference or cancellation to reduce the sound so as not to frighten or adversely affect the animal. In another embodiment, vacuum 106 is located relatively far from cleaning head 108 or on the opposite side of a wall or structure such that the sound produced by vacuum 106 is relatively low and does not frighten or otherwise adversely affect the animal.

During use, the suction of vacuum 106 collects waste debris such as the cleaning agent, loose hair, dislodged dirt, debris, parasites, and/or other foreign matter that is collected by cleaning agent/contaminated fluid extraction nozzle 130 and rinsing agent/contaminated fluid extraction nozzle 134. In one embodiment, vacuum 106 contains fluid release mechanism 144 to assist in the disposal of the waste debris. Fluid release mechanism 144 is located proximate to the bottom of vacuum 106 and upon activation, allows the waste debris to flow out of the bottom of vacuum 106. In one embodiment, fluid release mechanism 144 may have a mechanical action to help extract the waste debris from vacuum 106. In one embodiment, fluid release mechanism is a fluid release ball valve or float as is known in the art. In one embodiment, the waste debris is cleaned and re-circulated back into the system.

In one embodiment animal cleaner 102 contains dryer 136. Dryer 136 blows heated dry air under the animal's coat drying both its skin and hair. The heated air may be supplied by vacuum 106 through dryer conduit 120 or from some other source capable of producing heated dry air such as heating element 138. In one embodiment, heating element 138 is located in vacuum 106 and in another embodiment, heating element 138 is located in dryer conduit 120. In another embodiment, heating element 138 is located in cleaning head 108. The temperature of the heated air is such that it will not burn, scald, or otherwise harm the animal. In one embodiment dryer 136 blows relatively hot, relatively warm or ambient air to dry the animal depending on the circumstances.

Figure 4:
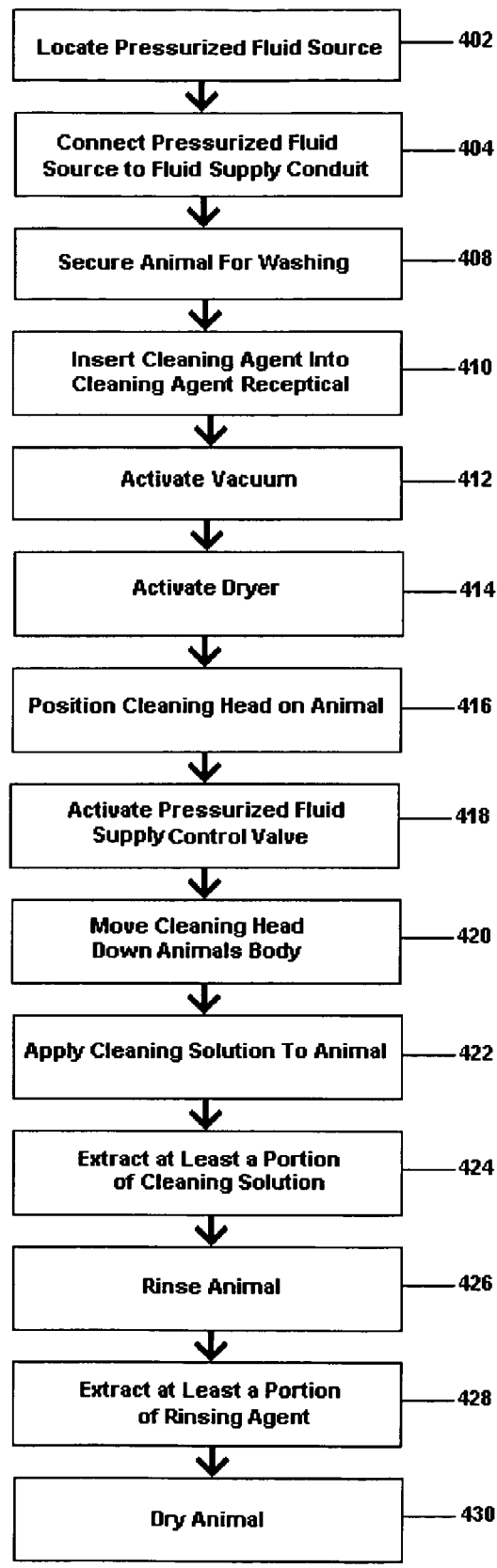
FIG. 4 is a block diagram depicting the steps of using an animal washing device in accordance with an embodiment of the present invention.

FIG. 4 shows the steps for using animal cleaner 102. First, pressurized fluid source 112 is located, Step 402. Pressurized fluid source may be a faucet, hydrant, or a self contained source of pressurized fluid similar to the one shown in FIG. 3. Pressurized fluid source 112 is then connected to pressurized fluid supply conduit 116 such that pressurized fluid can be delivered to pressurized fluid supply conduit 116, Step 404. Then, the animal to be washed is secured and prepared for washing, Step 408. Because the system can be operated relatively easily with one hand, securing the animal may be relatively simple such as securing the animal with a free hand. Alternatively, the animal may be secured with a rope or leash attached to a relatively immobile object such that the user may use both hands to wash the animal or a free hand to sooth the animal.

Next, the cleaning agent that will be used to clean the animal is inserted into cleaning agent receptacle 124, Step 410. Then, vacuum 106 is activated, Step 412 and in one embodiment, dryer 136 is activated, Step 414. Next, cleaning head 108 is positioned on the animals coat or fur, Step 416. Upon activation of pressurized fluid supply control valve 122, Step 418, water and cleaning agent is at least partially forced into and under the animal's coat and in one embodiment onto it's skin. Next, cleaning head 108 is moved down the animal's body, Step 420 such that immediately after the cleaning agent has been forced at least partially into and under the animal's coat, and in one embodiment onto it's skin Step 422 at least a portion of the cleaning agent is extracted along with some dislodged hair, dirt, debris, parasites, and/or other foreign matter from the animal's coat and skin via cleaning agent/contaminated fluid extraction nozzle 130, Step 424. Next, at least one rinsing agent spray nozzle 132 at least partially forces pressurized fluid into and under the animal's coat and in one embodiment onto it's skin, Step 426 and immediately after the rinsing agent has been at least partially forced into and under the animal's coat, it is at least partially extracted along with a portion of any remaining cleaning agent, loose hair, dislodged dirt, debris, parasites, and/or other foreign matter from the animal's coat and skin via rinsing agent/contaminated fluid extraction nozzle 134, Step 428. In one embodiment, dryer 136 blows warm air into and under the animal's coat, Step 430 thereby drying at least a portion of the animal's skin and hair such that all five steps of the cleaning and drying process take place almost simultaneously within the length of the cleaning head while it is being moved along the animal's body. Thereby, in a solitary progressive motion the cleaning and drying of the animal's coat and skin is performed in a single uninterrupted action.

There may be a time when the animal may just need to be dried off or given a quick rinse such as when the animal has been outside in the rain or playing in water. Therefore, in one embodiment, only the steps necessary for rinsing and drying the animal may be performed. In another embodiment, the pressurized fluid supply, vacuum assembly, and forced air dryer functions can be operated together or independently depending on the circumstances. In another embodiment, the system can use either hot, cold, or warm fluids depending on the need and availability of such fluids.

It should be understood that the foregoing relates to exemplary embodiments of the invention and that modifications may be made without departing from the spirit and scope of the invention as set forth in the following claims. Any attempt to construct a similar device within the spirit and scope of the present invention, will be apparent to those skilled in the art.

What is claimed is:

1. An animal washing system comprising:
   a pressurized fluid source;
   a cleaning head wherein the cleaning head contains a first nozzle for discharging fluid from the pressurized fluid source;
   a conduit for transporting the fluid from the fluid source to the first nozzle;
   a first vacuum for collecting at least a portion of the fluid discharged from the first nozzle; and
   a dryer.

2. The animal washing system of claim 1 further comprising a fluid supply valve to control the discharge of the first nozzle.

3. The animal washing system of claim 2 further comprising a comb on the end of the cleaning head.

4. The animal washing system of claim 2 wherein the pressurized fluid source is relatively portable.

5. The animal washing system of claim 2 further comprising:
   a second nozzle wherein a discharge of the second nozzle is controlled by the fluid supply valve; and
   a cleaning agent receptacle between the first nozzle and the pressurized fluid source such that matter in the cleaning agent receptacle is entrained in the fluid before being discharged from the first nozzle.

6. The animal washing system of claim 5 further comprising a second vacuum for collection of at least a portion of the fluid discharged from the second nozzle.

7. The animal washing system of claim 5 wherein the fluid supply valve controls the first nozzle independent of the second nozzle.

8. The animal washing system of claim 7 wherein the pressurized fluid source is a faucet or hydrant.

9. A method of washing an animal, the method comprising the steps of:
   locating a pressurized fluid source;
   connecting the pressurized fluid source to a pressurized fluid supply conduit;
   securing a animal to be washed;
   inserting a cleaning agent into a cleaning agent receptacle such that matter in the cleaning agent receptacle is entrained in fluid from the pressurized fluid source before being discharged from a first nozzle;
   positioning a cleaning head onto the animal wherein the cleaning head contains the first nozzle;
   activating a first vacuum wherein a vacuum force is created proximate to the first nozzle;
   activating a fluid supply control valve such that pressurized the fluid from the pressurized fluid source is discharged from the first nozzle;
   activating a dryer wherein the dryer is located on the cleaning head; and
   moving the cleaning head down the animal such that at least a portion of the cleaning agent is extracted by the first vacuum.

10. The method of claim 9 wherein the cleaning head further comprises a second nozzle and a second vacuum wherein the second vacuum creates a vacuum force proximate to the second nozzle.

11. The method of claim 10 wherein the fluid supply valve controls the discharge from the first nozzle independent of a discharge from the second nozzle.

12. The method of claim 10 wherein the vacuum contains an impeller to extract matter collected from the first vacuum and the second vacuum.

13. The method of claim 10 wherein the second nozzle and the second vacuum can be operated independently of the first nozzle and the first vacuum.

14. The method of claim 9 wherein the pressurized fluid source is relatively portable.

15. The method of claim 9 wherein the pressurized fluid source is a faucet.

16. A portable animal washing system comprising:
   a pressurized fluid source;
   a cleaning head wherein the cleaning head contains a first nozzle and a second nozzle for discharging fluid from the pressurized fluid source;
   a conduit for transporting the fluid from the fluid source to the first nozzle and the second nozzle;
   a cleaning agent receptacle between the first nozzle and the pressurized fluid source such that matter in the cleaning agent receptacle is entrained in the fluid before being discharged from the first nozzle;
   a fluid supply valve to control the discharge of the first nozzle and the second nozzle;
   a first vacuum for collecting at least a portion of the fluid discharged from the first nozzle; and
   a second vacuum for collecting at least a portion of the fluid discharged from the second nozzle.

17. The animal washing system of claim 16 further comprising a dryer.

18. The animal washing system of claim 16 wherein the pressurized fluid source is relatively portable.

19. The animal washing system of claim 16 wherein the fluid supply valve controls the discharge from the first nozzle independent of a discharge from the second nozzle.

20. The animal washing system of claim 16 wherein the pressurized fluid source is a faucet.

* * * * *